Feb. 17, 1970 R. A. RICHARDSON 3,496,470

FREQUENCY MODULATION TRANSMITTER WITH CRYSTAL FILTER INTERPOSED BETWEEN CLASS C FREQUENCY MULTIPLIERS FOR NOISE REDUCTION

Filed July 11, 1966

Inventor
ROY A. RICHARDSON.
BY
Mueller, Aichele & Rauner
ATTYS.

United States Patent Office 3,496,470
Patented Feb. 17, 1970

3,496,470

FREQUENCY MODULATION TRANSMITTER WITH CRYSTAL FILTER INTERPOSED BETWEEN CLASS C FREQUENCY MULTIPLIERS FOR NOISE REDUCTION

Roy A. Richardson, Long Grove, Ill., assignor to Motorola, Inc., Franklin, Park, Ill., a corporation of Illinois Filed July 11, 1966, Ser. No. 564,390
Int. Cl. H04b *1/02*
U.S. Cl. 325—146 1 Claim

ABSTRACT OF THE DISCLOSURE

Frequency modulation transmitter having a chain of frequency multipliers operating in a non-linear Class C mode to increase the frequency and deviation of the FM signal, with a sharp cut-off crystal filter interposed between frequency multipliers in the chain. The filter has a passband with a width just great enough to pass the desired signal from the preceding frequency multiplier, and it also passes noise and undesired signals within its passband. The filter excludes undesired signals and noise outside its passband from the succeeding frequency multipliers so that the undesired signals and noise in the passband, which are subsequently frequency multiplied and amplified by the succeeding frequency multipliers, are not substantially greater in frequency deviation or in amplitude than the noise and undesired signals introduced by such succeeding frequency multipliers.

This invention relates to frequency modulation (FM) transmitters wherein noise and unwanted signals are reduced in amplitude and more particularly to noise reduction in such transmitters having a chain of frequency multipliers for providing the FM signal. This invention has special interest for FM transmitters used in a multichannel radio system having closely spaced channels subject to interchannel interference.

Frequency multipliers used in FM transmitters, especially when operated in the non-linear Class C mode, introduce noise in the form of undesired signals (modulation components). For example, those FM transmitters having a phase modulator wherein the frequency is multiplied many times to generate an FM signal from the phase modulation, such undesired modulation components can cause substantial interference with the desired signal. Further, any sidebands introduced into the signal by the phase modulator are multiplied and increased in amplitude and frequency deviation in the several stages of Class C frequency multiplication. In radio systems having a plurality of channels of closely-spaced frequencies, such as found in mobile radio telephone systems, such frequency multiplied sidebands may appear in adjacent channels as undesired signals. While several arrangements have been used to reduce the interchannel interference, as well as the undesired signal within a given channel, such arrangements have proven not to be entirely satisfactory, particularly in the situation described above.

Accordingly, it is an object of this invention to provide improved noise reduction in FM transmitters having frequency multiplication.

It is another object of this invention to provide a low-cost low-power noise reduction system in an FM transmitter having non-linear Class C operated frequency multipliers.

A feature of this invention resides in the provision of a low-power sharp cutoff bandpass filter, such as a crystal filter, electrically interposed in a low-power portion of a chain of serially arranged frequency multipliers for bandwidth limiting the passage of undesired signals and noise.

Referring now to the accompanying drawing.

An FM transmitter has a chain of series connected frequency multipliers, such as doublers and triplers, for providing the transmitted FM signal. According to this invention, in the chain of frequency multipliers there is provided a filtering action which eliminates all but the more important frequency components. Subsequent to the filtering action, the passed signals, including noise and unwanted signals, are frequency multiplied and amplified for transmission. In a preferred embodiment of this invention a sharp cutoff crystal-type filter is electrically interposed between the first and second frequency multipliers in the chain of frequency multipliers.

The crystal filter in addition to passing the desired signals also passes all undesired signals and other noise falling within the passband. Such noise and undesired signals are frequency multiplied and amplified along with the desired signals. It was originally believed that such filtering action followed by non-linear Class C operated frequency multipliers would result in no substantial noise reduction. It is known that such multiplication tends to diminish the effect of the filter, therefore, it was not obvious that placing a filter ahead of frequency multipliers would have any effect whatsoever in reducing undesired signals and noise from the transmitted signal. Non-linear frequency multipliers also introduce additional frequency components from all multiplied noise and undesired signals. It has been found, however, that with a crystal filter having a ±7 kc. band at the 1 db point and inserted between the first and second frequency doublers on an FM transmitter resulted in a signal-to-noise improvement of approximately 20 db.

Since crystal filters are low-power devices, it is preferred that such a filter be inserted between first and second frequency multipliers where the power level of the desired modulated signal is still relatively low.

Figure 1:
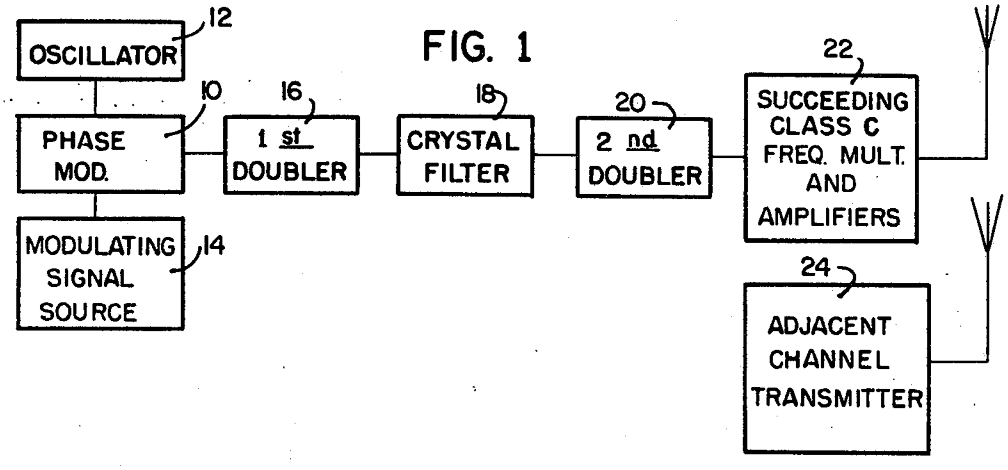
FIG. 1 is a block diagram for an FM transmitter utilizing the subject invention.

Referring now to FIG. 1, phase modulator 10 receives a radio frequency signal from oscillator 12 which is modulated therein by the modulating signal, such as by voice or a tone, from source 14. Phase modulator 10 supplies the phase-modulated signal to a first frequency doubler 16. Doubler 16 supplies its doubled output to crystal filter 18. In one embodiment of the present invention filter 18 was a commercially available crystal filter having inductive and capacitive components and designed in the usual manner. Its characteristics included a ±7 kc. bandwidth at the 1 db point. At the 11 db points it had a bandwidth of ±20 kc., while at the 20 db points the bandwidth was ±30 kc. The flyback is a minimum of 20 db. Such a crystal filter provided a 20 db improvement in signal-to-noise ratio in a 150 mc. mobile radio telephone system having closely spaced radio channels, both in a given channel and in adjacent channels.

Crystal filter 18 supplies its filtered output signals to second frequency doubler 20 which in turn supplies the doubled and filtered frequencies to subsequent non-linear Class C frequency multipliers and RF circuits 22 for transmission over a suitable antenna. Unit 22 represents several doublers and triplers. Adjacent channel transmitter 24 is illustrated to show plural channel operation. It is understood that transmitters 10–22 operate on a closely spaced channel with respect to the transmitter 24 used channel. The circuits required to implement the FIG. 1 transmitter are all well known, it being sufficient to insert a commercial crystal filter 18 in an existing transmitter, with the usual attention being paid to matched impedances, to accomplish the results of this invention.

Figure 2:
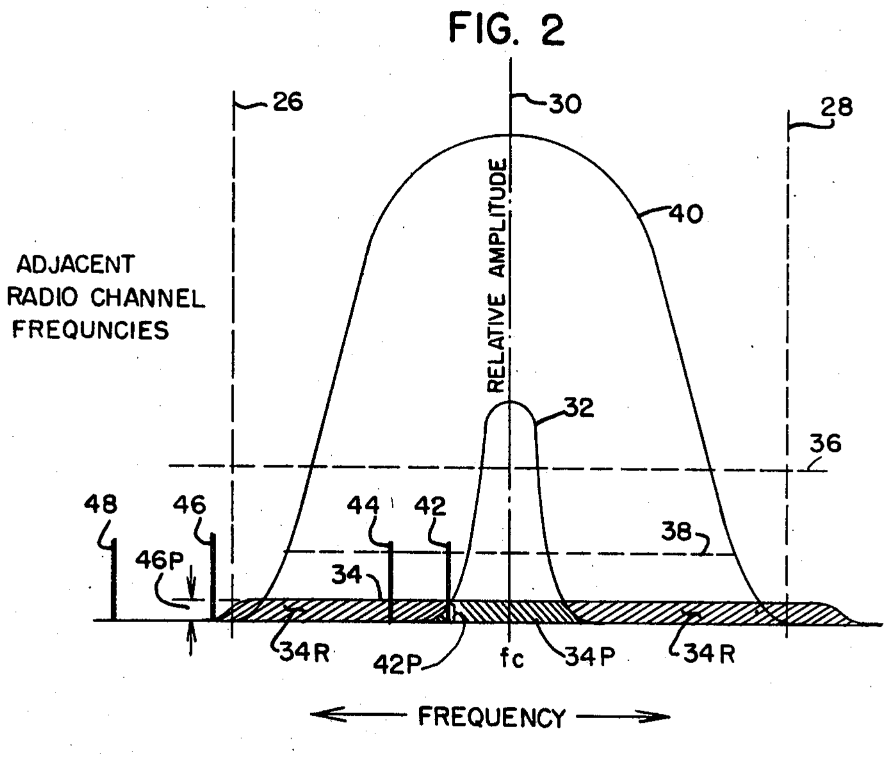
FIG. 2 is an idealized graph showing frequencies and interference signals in adjacent closely spaced radio channels.

The effect of the filtering action of filter 18 in the early stages of frequency multiplication is now explained with reference to FIG. 2. The FM radio channel under consideration is bounded by frequencies indicated by dotted lines 26 and 28 while the center frequency of the channel is indicated by vertical ordinate 30. Ordinate 30 also represents the center frequency, $f_c$, of crystal filter 18 as such center frequency is translated by the succeeding frequency multipliers 20, 22 and therefore frequency translated to the center of the radio channel. All curves illustrated in FIG. 2 are correspondingly so frequency translated. Curve 40 represents the transmitted FM signal from unit 22 and is an amplification and frequency multiplication of filter 18 passed signals as shown by curve 32. Displacement on ordinate 30 represents relative amplitudes of the filtered signals, it being understood that the power level of first frequency doubler 16 is substantially less than the power level supplied by subsequent Class C frequency multipliers 22. The relative amplitude illustrates only the bandpass characteristics of the FIG. 1 transmitter which utilizes filter 18.

Horizontal line 34 represents the noise level supplied to filter 18 by first doubler 16. Hatched portions 34R represent noise rejection by filter 18 while hatched portion 38P represents noise from first doubler 16 passed by filter 18 to succeeding frequency multipliers 20–22. If rejected noise signals in 34R were passed from first doubler 16 to succeeding frequency multipliers 20–22 then noise level 34 would be amplified and would introduce additional frequency components having a wide frequency deviation as represented by horizontal line 36. A portion of the frequency multiplied and amplified noise under line 36 extends into adjacent channels on either side of the channel frequency limits 26 and 28. The filter, by eliminating noise portion 34R from the transmitter, then limits the frequency multiplication and amplification of noise represented by 34P to transmit an output noise indicated by horizontal line 38 within the curve 40. Most of the noise, therefore, is limited to the frequency amplitude area under line 38 and within curve 40. The curve 40 represents the output of the Class C frequency multipliers 20, 22 which receive filtered signals from crystal filter 18.

Filter 18 also reduces amplitudes of undesired signals adjacent its passband of frequencies. For example, a tone modulation component 42 may have an amplitude as shown which, without filtering, produces a signal 46 in an adjacent channel along boundary 26. Filter 18 permits only portion 42P to pass to subsequent frequency multipliers and therefore limits the undesired portions of the tone modulation components in adjacent channels to that indicated by portion 46P. Additional frequency modulation components of a tone, indicated by vertical bar 44, are completely eliminated from subsequent frequency multipliers by filter 18, therefore eliminating all interference in adjacent channels such as the undesired frequencies indicated by bar 48.

While the subsequent frequency multipliers do frequency multiply and amplify noise passed through filter 18, it has been found that in practicing the subject invention the total noise in the FM transmission is reduced by about 20 db and also in closely adjacent channels the interchannel interference is also reduced by 20 db. It has been further found that the undesired signals passed by filter 18 and multiplied and amplified by subsequent frequency multipliers 20–22 are not greater in amplitude and frequency dispersion than the undesired signals and noise introduced by such succeeding frequency multipliers. Therefore, filter 18 when inserted in the chain of frequency multiplication of an FM transmitter provides effective noise reduction even though inserted ahead of non-linear Class C operated frequency multipliers.

What is claimed is:

1. A frequency modulation transmitter for use in a multi-channel radio communication system operating at a frequency in the range above 100 megacycles and wherein separate signals are present on adjacent channels, including in combination, means for producing a carrier wave frequency modulated by voice signals, first frequency multiplier means coupled to said first named means for multiplying the frequency and deviation of the frequency modulated signal, second frequency multiplier means operated in a non-linear Class C mode for amplifying and multiplying the frequency and deviation of the signal applied thereto to provide a signal extending over a predetermined frequency band, and bandpass filter means including piezoelectric resonator means coupling the input of said second frequency multiplier means to the output of said first frequency multiplier means, said bandpass filter means having a passband with a width of the order of plus or minus 7 kilocycles to pass the desired signals from said first frequency multiplier means and which falls within and is substantially narrower than said predetermined band of said second frequency multiplier means, said bandpass filter means attenuating signals and noise from said first frequency multiplier means outside said passband thereof to thereby reduce interference in adjacent channels and applying signals and noise within said passband to said second frequency multiplier means and cooperating therewith so that undesired signals and noise within the predetermined band produced by said second frequency multiplier means from signals and noise applied thereto are no greater in amplitude than undesired signals and noise within the predetermined band developed in said second frequency multiplier means.

References Cited

UNITED STATES PATENTS

| | | | |
|---|---|---|---|
| 1,849,620 | 3/1932 | Hansell | 325—147 |
| 1,878,308 | 9/1932 | Hansell | 325—153 X |
| 2,005,084 | 6/1935 | Hansell | 325—137 X |
| 2,098,698 | 11/1937 | Armstrong | 325—148 X |

JOHN W. CALDWELL, Primary Examiner

B. V. SAFOUREK, Assistant Examiner

U.S. Cl. X.R.

325—158; 343—207